(12) United States Patent
Lin

(10) Patent No.: US 10,256,583 B2
(45) Date of Patent: Apr. 9, 2019

(54) POWER ADAPTER

(71) Applicant: FSP TECHNOLOGY INC., Taoyuan (TW)

(72) Inventor: Kuo-Fan Lin, Taoyuan (TW)

(73) Assignee: FSP TECHNOLOGY INC., Taoyuan (TW)

(*) Notice: Subject to any disclaimer, the term of this patent is extended or adjusted under 35 U.S.C. 154(b) by 4 days.

(21) Appl. No.: 15/202,579

(22) Filed: Jul. 6, 2016

(65) Prior Publication Data
US 2017/0047838 A1    Feb. 16, 2017

Related U.S. Application Data

(60) Provisional application No. 62/202,925, filed on Aug. 10, 2015.

(30) Foreign Application Priority Data

May 17, 2016  (CN) .......................... 2016 1 0326363

(51) Int. Cl.
*H01R 24/68* (2011.01)
*H02M 7/00* (2006.01)
(Continued)

(52) U.S. Cl.
CPC ......... *H01R 24/68* (2013.01); *H01R 13/6658* (2013.01); *H01R 2103/00* (2013.01); *H02M 7/003* (2013.01); *H02M 7/12* (2013.01)

(58) Field of Classification Search
CPC ........................... H01R 24/68; H01R 13/6658; H01R 2103/00; H02M 7/003; H02M 7/12
(Continued)

(56) References Cited

U.S. PATENT DOCUMENTS 5,818,705 A *  10/1998  Faulk .................... G06F 1/1616
                                                 363/45
7,515,448 B2 *  4/2009  Takahashi ............. H02M 7/003
                                                 361/760
(Continued)

OTHER PUBLICATIONS

Received STIC report from EIC 2800 searcher Benjamin Martin on Apr. 6, 2017.*
(Continued)

*Primary Examiner* — Jue Zhang
*Assistant Examiner* — Htet Z Kyaw
(74) *Attorney, Agent, or Firm* — JCIPRNET

(57) ABSTRACT

A power adapter including a main circuit board and an auxiliary circuit board is provided. The main circuit board has a first surface and a second surface opposite to each other, and the first surface of the main circuit board is configured with a transformer and a first capacitor. The auxiliary circuit board has a first surface and a second surface opposite to each other, and the first surface of the auxiliary circuit board is configured with an input rectifier filter circuit, where the auxiliary circuit board is disposed in parallel above the main circuit board, and the input rectifier filter circuit of the auxiliary circuit board is electrically connected to the first capacitor of the main circuit board. Under a condition of same electrical parameters and dimensions, the volume of the power adapter of the invention is only a half of that of the existing power adapter, which satisfies a demand for miniaturization of the electronic devices.

17 Claims, 8 Drawing Sheets

(51) Int. Cl.
*H01R 13/66* (2006.01)
*H01R 103/00* (2006.01)
*H02M 7/12* (2006.01)

(58) Field of Classification Search
USPC .................................................. 363/44, 146
See application file for complete search history.

(56) References Cited

U.S. PATENT DOCUMENTS

| | | | | |
|---|---|---|---|---|
| 7,889,043 | B2* | 2/2011 | Hsu | H01F 27/06 336/200 |
| 9,697,717 | B2* | 7/2017 | Montero | G08B 21/18 |
| 9,847,710 | B2* | 12/2017 | Lee | H02M 1/4258 |
| 2004/0075419 | A1* | 4/2004 | Massey | H02J 1/14 320/117 |
| 2004/0132322 | A1* | 7/2004 | Brandenburg | H01R 13/719 439/75 |
| 2005/0248968 | A1* | 11/2005 | Chang | H02M 1/4225 363/125 |
| 2006/0071647 | A1* | 4/2006 | Takahashi | H02M 7/003 320/166 |
| 2006/0174143 | A1* | 8/2006 | Sawyers | G06F 1/26 713/300 |
| 2007/0210724 | A1* | 9/2007 | Unkrich | H02J 7/022 315/209 R |
| 2008/0126818 | A1* | 5/2008 | Sawyers | G06F 1/1616 713/330 |
| 2010/0033282 | A1* | 2/2010 | Hsu | H01F 27/06 336/65 |
| 2010/0061130 | A1* | 3/2010 | Zhang | H01R 12/718 363/146 |
| 2011/0051476 | A1* | 3/2011 | Manor | H02M 1/14 363/65 |
| 2012/0014057 | A1* | 1/2012 | Stella | G06F 1/1635 361/679.55 |
| 2012/0014144 | A1* | 1/2012 | Xu | H02M 1/44 363/48 |
| 2012/0104947 | A1* | 5/2012 | Nerone | F21V 23/00 315/51 |
| 2014/0062207 | A1* | 3/2014 | Lu | H02J 7/0068 307/80 |
| 2014/0268564 | A1* | 9/2014 | Sagneri | H05K 7/209 361/692 |
| 2014/0308853 | A1* | 10/2014 | Colahan | H01R 13/6675 439/628 |
| 2015/0115712 | A1* | 4/2015 | Chen | G06F 1/30 307/23 |
| 2015/0116891 | A1* | 4/2015 | Park | H01G 4/40 361/270 |
| 2015/0253830 | A1* | 9/2015 | Montero | H02J 7/0068 713/340 |
| 2016/0006005 | A1* | 1/2016 | Sakakibara | H01M 2/1094 429/7 |
| 2016/0029890 | A1* | 2/2016 | Stump | G16H 50/30 600/301 |
| 2016/0062428 | A1* | 3/2016 | Zeng | G06F 1/20 713/300 |
| 2016/0094147 | A1* | 3/2016 | Yu | H02M 3/33507 363/45 |
| 2016/0276783 | A1* | 9/2016 | Colahan | H01R 13/6675 |
| 2016/0294296 | A1* | 10/2016 | Lee | H02M 1/4258 |
| 2016/0359426 | A1* | 12/2016 | Jitaru | H05K 1/0256 |

OTHER PUBLICATIONS

Received STIC search report from EIC 2800 searcher Samir Patel on May 16, 2018.*

* cited by examiner

POWER ADAPTER

CROSS-REFERENCE TO RELATED APPLICATION

This application claims the priority benefits of U.S. provisional application Ser. No. 62/202,925, filed on Aug. 10, 2015 and Chinese application serial no. 201610326363.3, filed on May 17, 2016. The entirety of each of the above-mentioned patent applications is hereby incorporated by reference herein and made a part of this specification.

BACKGROUND OF THE INVENTION

Field of the Invention

The invention relates to a field of power supply, and particularly relates to a power adapter with a small volume and a good heat dissipation effect.

Description of Related Art

Power adapter is a power transforming device for a compact portable electronic device or an electronic appliance, and is widely applied to wireless landlines, game machines, notebook computers, etc.

A general power adapter mainly includes an input terminal connected to an external power supply, a power portion used for converting the external power supply and an output line for connecting with a device such as a notebook computer, etc. The power portion includes a casing, a circuit board and a plurality of circuits (for example, an input circuit, a conversion circuit, an output circuit) distributed on the circuit board. A power achieved by the power portion is determined by electrical parameters and dimensions of each of the components, and a volume of the circuit board and the entire power portion is determined by the dimensions of each of the components and configuration positions thereof. However, under a condition of the same electrical parameters and dimensions, configuration of each of the components is hard to decrease the volume of the circuit board and the entire power portion, such that current consumer's demand on miniaturization of the electronic devices is hard to be satisfied.

Therefore, it is necessary to provide a power adapter with a small volume under the condition of the same electrical parameters and dimensions, so as to make up the deficiency of the prior art.

SUMMARY OF THE INVENTION

The invention is directed to a power adapter with a smaller volume under same electrical parameters.

An embodiment of the invention provides a power adapter including a main circuit board and an auxiliary circuit board. The main circuit board has a first surface and a second surface opposite to each other, and the first surface of the main circuit board is configured with a transformer and a first capacitor. The auxiliary circuit board has a first surface and a second surface opposite to each other, and the first surface of the auxiliary circuit board is configured with an input rectifier filter circuit, where the auxiliary circuit board is disposed in parallel above the main circuit board, and the input rectifier filter circuit of the auxiliary circuit board is electrically connected to the first capacitor of the main circuit board.

Preferably, the first surface of the main circuit board is configured with a first inductor and an output terminal, the transformer, the first inductor, and the output terminal are disposed adjacent to the first capacitor and are electrically connected to each other, and the transformer, the first inductor and the output terminal are all located at an end away from the auxiliary circuit board.

Preferably, the power adapter further includes an output line connected to the output terminal.

Preferably, the first capacitor is an energy storage capacitor, and a capacity of the energy storage capacitor is between 65 μF and 100 μF.

Preferably, the input rectifier filter circuit includes an input terminal, an electromagnetic interference (EMI) filter circuit and a rectifier element.

Preferably, the first surface of the auxiliary circuit board faces the first surface of the main circuit board, and components of the EMI filter circuit are disposed between the first surface of the auxiliary circuit board and the first surface of the main circuit board.

Preferably, the EMI filter circuit includes a second inductor, a second capacitor and a third inductor electrically connected to each other, and the second inductor, the second capacitor and the third inductor are sequentially disposed between the input terminal and the rectifier element.

Preferably, the second surface of the auxiliary circuit board faces the first surface of the main circuit board, and components of the EMI filter circuit are away from the first surface of the main circuit board.

Preferably, the EMI filter circuit includes a fourth inductor, a third capacitor and a fifth inductor electrically connected to each other, the fourth inductor and the fifth inductor are sequentially disposed between the input terminal and the rectifier element, and the third capacitor is disposed above the fifth inductor.

Preferably, pins of the rectifier element are electrically connected to the first surface of the auxiliary circuit board, and the rectifier element is located on a side surface of the auxiliary circuit board.

Preferably, the second surface of the auxiliary circuit board is configured with a voltage dividing circuit, and the voltage dividing circuit is electrically connected between the EMI filter circuit and the rectifier element.

Preferably, the power adapter includes a conductive member, and the conductive member supports between the main circuit board and the auxiliary circuit board, and the conductive member is electrically connected to the first capacitor of the main circuit board and the rectifier element of the auxiliary circuit board.

Preferably, the power adapter further includes an input plug connected to the input terminal.

Preferably, the second surface of the main circuit board is configured with a pulse width modulation (PWM) circuit, a synchronous rectifier circuit and a control chip.

Preferably, a longitudinal length of the main circuit board is greater than a lateral width thereof, and the auxiliary circuit board is disposed at an end of the main circuit board along a longitudinal direction.

Preferably, the first capacitor has a long-shaft shape, and a long-shaft of the first capacitor is parallel to the longitudinal direction of the main circuit board.

Preferably, an area of the auxiliary circuit board is one third of an area of the main circuit board.

Preferably, a length of the main circuit board is between 41 mm and 43 mm, and a width thereof is between 39 mm and 40 mm.

Preferably, a length of the power adapter is between 44 mm and 47 mm, a width thereof is between 44 mm and 45 mm, and a height thereof is between 24 mm and 25 mm.

Preferably, a power of the power adapter is 55 watts to 65 watts.

Compared to the existing technique, in the power adapter of the invention, as the front-end input rectifier filter circuit is independently disposed on the auxiliary circuit board, the main circuit board has more space for configuring circuit wirings and components, so that a usage area of the main circuit board is effectively decreased, and the length and width of the power adapter are decreased. Meanwhile, by gathering components with a larger volume such as the transformer and the first capacitor on the first surface of the main circuit board, components with a smaller volume can be disposed on the second surface of the main circuit board, and the auxiliary circuit board is disposed in parallel above the man circuit board, i.e. the components with similar heights are configured at a same side to facilitate close arrangement and decrease the height of the power adapter. Therefore, under a condition of same electrical parameters and dimensions, the volume of the power adapter of the invention is only a half of that of the existing power adapter, which satisfies a demand for miniaturization of the electronic devices.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
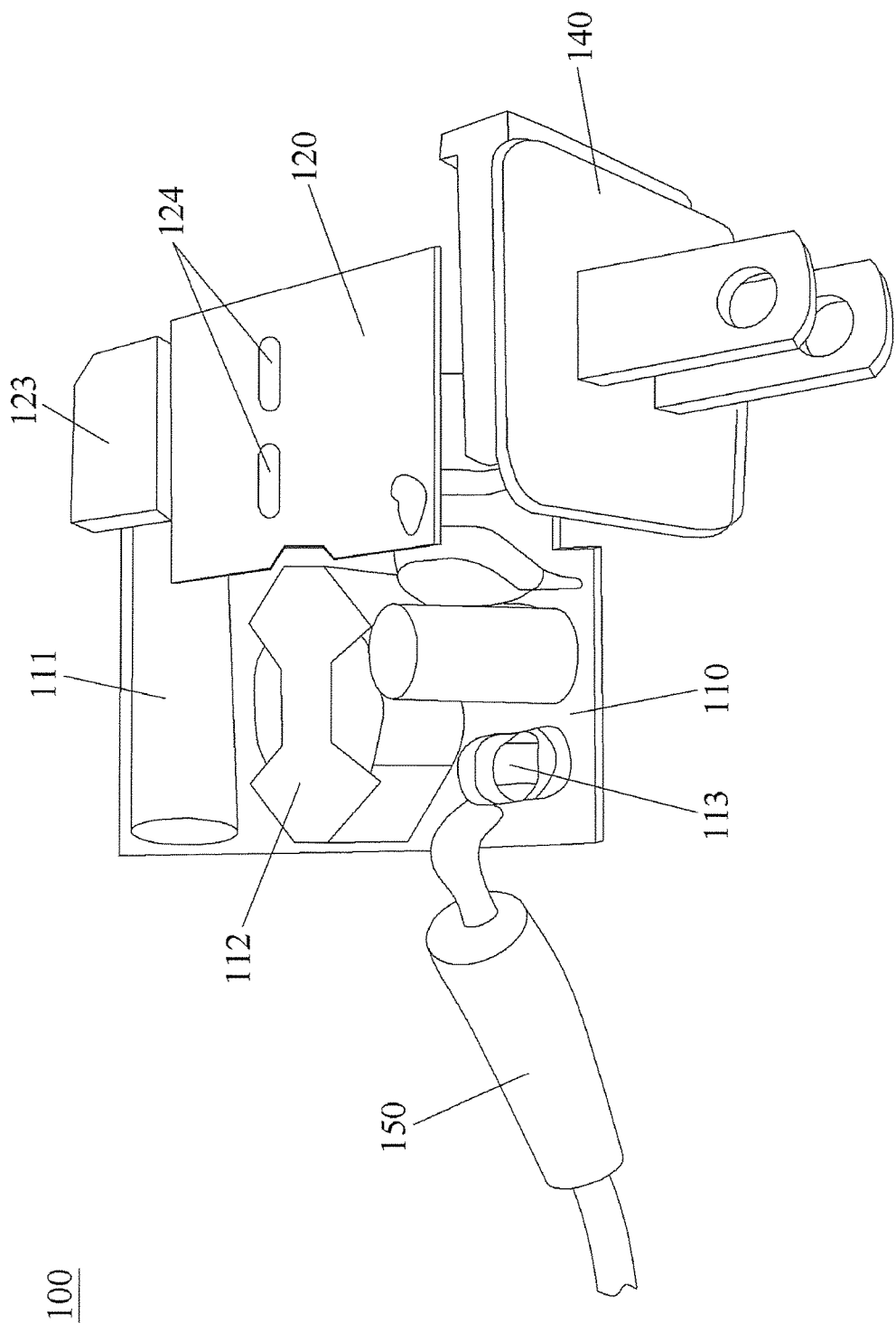
FIG. 1 is a three-dimensional view of a power adapter without a casing according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

A power adapter generally has an energy storage capacitor (e.g. Bulk capacitor) with a large volume, the volume is related to a capacity of the energy storage capacitor, and the capacity of the energy storage capacitor is direct proportional to a hold-up time of a power supply. The hold-up time refers to a lasting time or time length that the power supply can normally keep the output voltage at an output level when the device is shut down or the power is cut off. Taking a 65 watts power adapter as an example, the capacity of the energy storage capacitor is between 65 µF and 100 µF. The volume of the energy storage capacitor cannot be decreased due to limitation of the capacity thereof. To decrease the volume of the entire power adapter, configuration of internal components thereof has to be optimized or volumes of the internal components have to be decreased.

As shown in FIGS. 1-8, in view of the above deficiency, the invention provides a power adapter 100, and a power portion thereof includes a main circuit board 110, am auxiliary circuit board 120 and a conductive member 130. A front-end circuit of the power portion is independently disposed on the auxiliary circuit board 120, such that the main circuit board 110 has more space to configure circuit wirings and components, so as to effectively decrease a length of the main circuit board 110. Meanwhile, the auxiliary circuit board 120 is disposed in parallel above the main circuit board 110, and an input rectifier filter circuit of the auxiliary circuit board 120 is electrically connected to a first capacitor of the main circuit board, where the input rectifier filter circuit and the first capacitor 111 are electrically connected through the conductive member 130, so as to further decrease the height of the power adapter 100.

Referring to FIGS. 1-4 first, in a first embodiment of the invention, a longitudinal length of the main circuit board 110 is greater than a lateral width thereof, and one side of the main circuit board 110 along a longitudinal direction has a notch. The auxiliary circuit board 120 is disposed at one end of the main circuit board along the longitudinal direction, and an input terminal 121 thereon (which is described later) is disposed corresponding to the notch, and the notch is used for accommodating an input plug 140 (referring to FIG. 1).

To be specific, the main circuit board 110 has a first surface and a second surface opposite to each other, and the first surface of the main circuit board 110 is configured with a first capacitor 111 (C1), a transformer 112, a first inductor 113 (L1) and an output terminal 114, where the first capacitor 111, the transformer 112, the first inductor 113 are components of a pulse width modulation (PWM) circuit. The second surface of the main circuit board 110 is configured with other components of the PWM circuit, a synchronous rectifier circuit and a control chip, where the second surface of the main circuit board can also be configured with a power factor correction circuit, though the invention is not limited thereto. In the invention, the first capacitor 111 has a long-shaft shape, and the long-shaft of the first capacitor 111 is parallel to the longitudinal direction of the main circuit board 110, and in a height direction of the power adapter 100, the first capacitor 111 is located below a rectifier element 123 (referring to FIG. 1 and FIG. 2). The first capacitor 111 is the energy storage capacitor (e.g. Bulk capacitor). The transformer 112, the first inductor 113 and the output terminal 114 are sequentially disposed adjacent to the first capacitor 111, and the transformer 112, the first inductor 113 and the output terminal 114 are all located at an end away from the auxiliary circuit board 120. The output terminal 114 is disposed between the first inductor 113 and a lateral broadside of the main circuit board 110, and the output terminal 114 is used for connecting an output line 150 (referring to FIG. 1). In the present embodiment, components with a larger volume such as the first capacitor 111, the transformer 112, or the first inductor 113 are disposed on the first surface of the main circuit board 110, i.e. the components with similar heights are disposed on the same side to facilitate close arrangement and decrease the height of the power adapter 100, and effectively dissipate heat.

A power of the power adapter 100 of the invention is 55 W-65 W, and according to a following equation, it is known that a capacity $C_{min}$ of the first capacitor 111 is directly proportional to a hold-up time T of the power supply. To ensure that the first capacitor 111 satisfies the demand for the hold-up time T of the power adapter, a capacitor with the capacity $C_{min}$ ranges between 65 µF and 100 µF is required, a body length of the capacitor is between 38 mm and 42 mm, and in case that the body length of the first capacitor 111 cannot be decreased, the dimension of the main circuit board 110 can be decreased by configuring the first capacitor 111, the transformer 112, the first inductor 113 and the auxiliary circuit board 120 according to the aforementioned method. A length of the main circuit board 110 is between 41 mm and 43 mm, and a width thereof is between 39 mm and 40 mm. An area of the auxiliary circuit board 120 is about one third of an area of the main circuit board 110.

$$T = \frac{C_{min} \times (V_{bulk}^2 - V_{bfail}^2)}{2 \times \left(\frac{P_{out}}{EFF}\right)}$$

Figure 2:
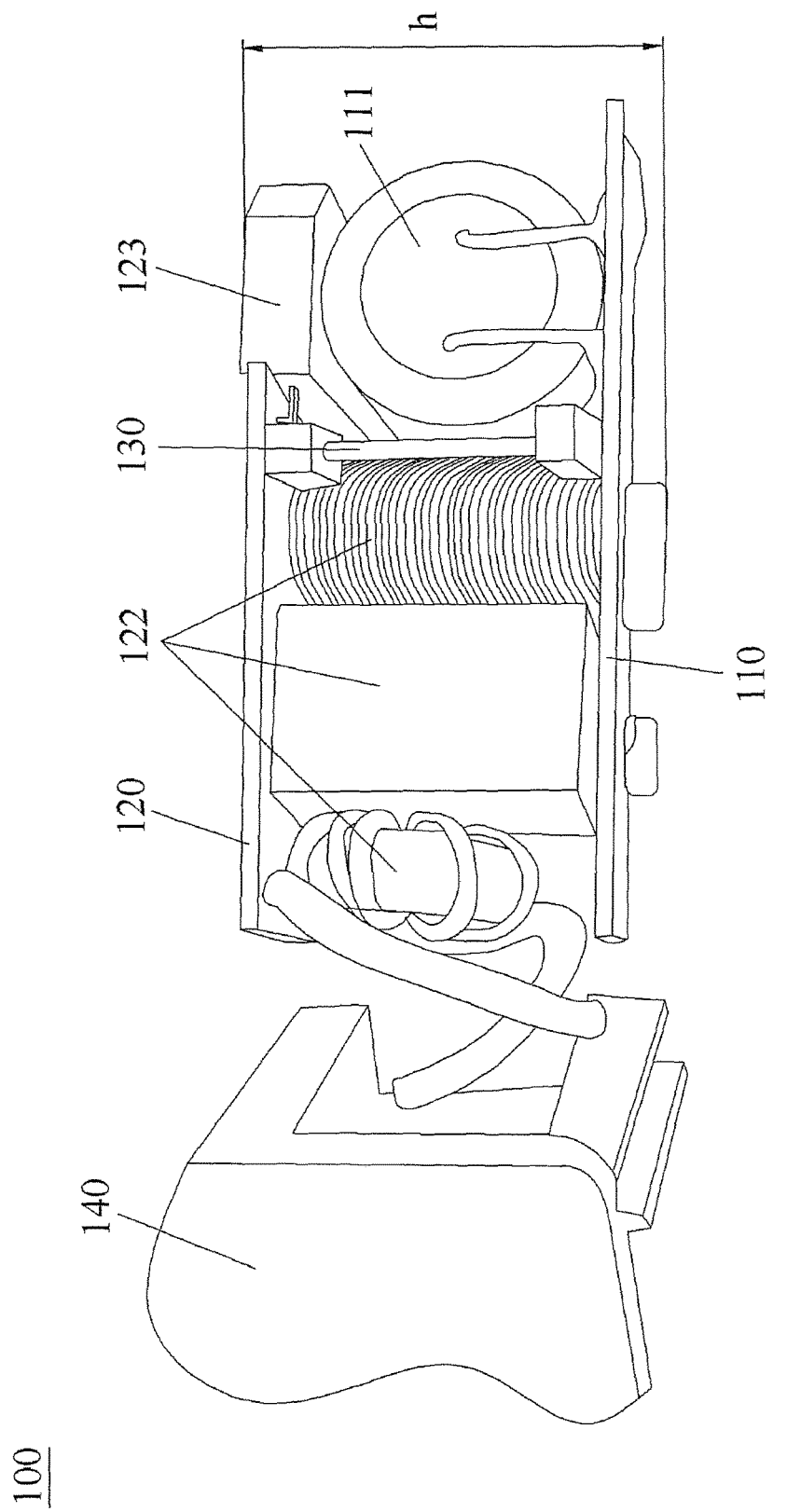
FIG. 2 is a side view of FIG. 1.
Figure 3:
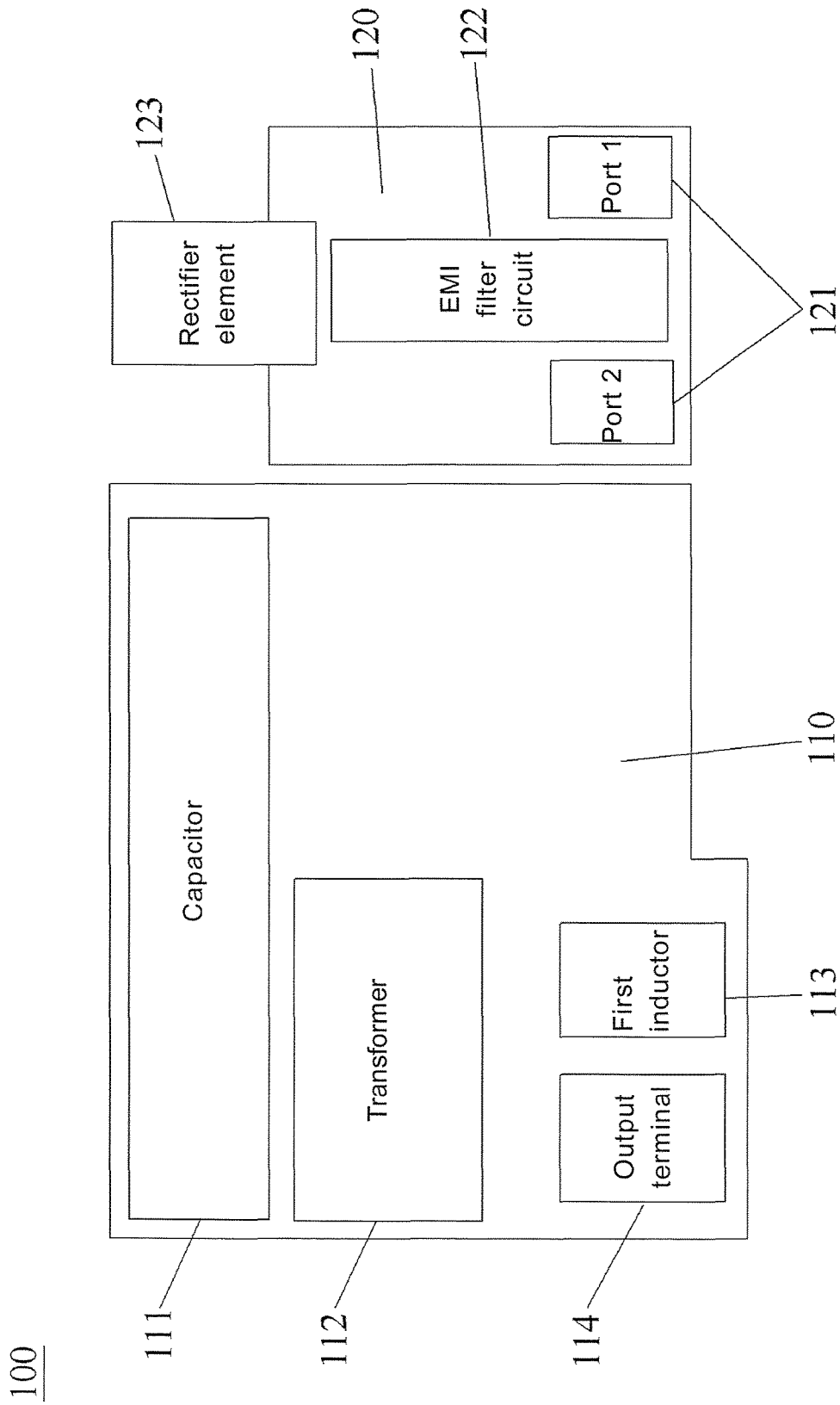
FIG. 3 is a front view of a circuit board of the power adapter of the first embodiment of the invention.
Figure 4:
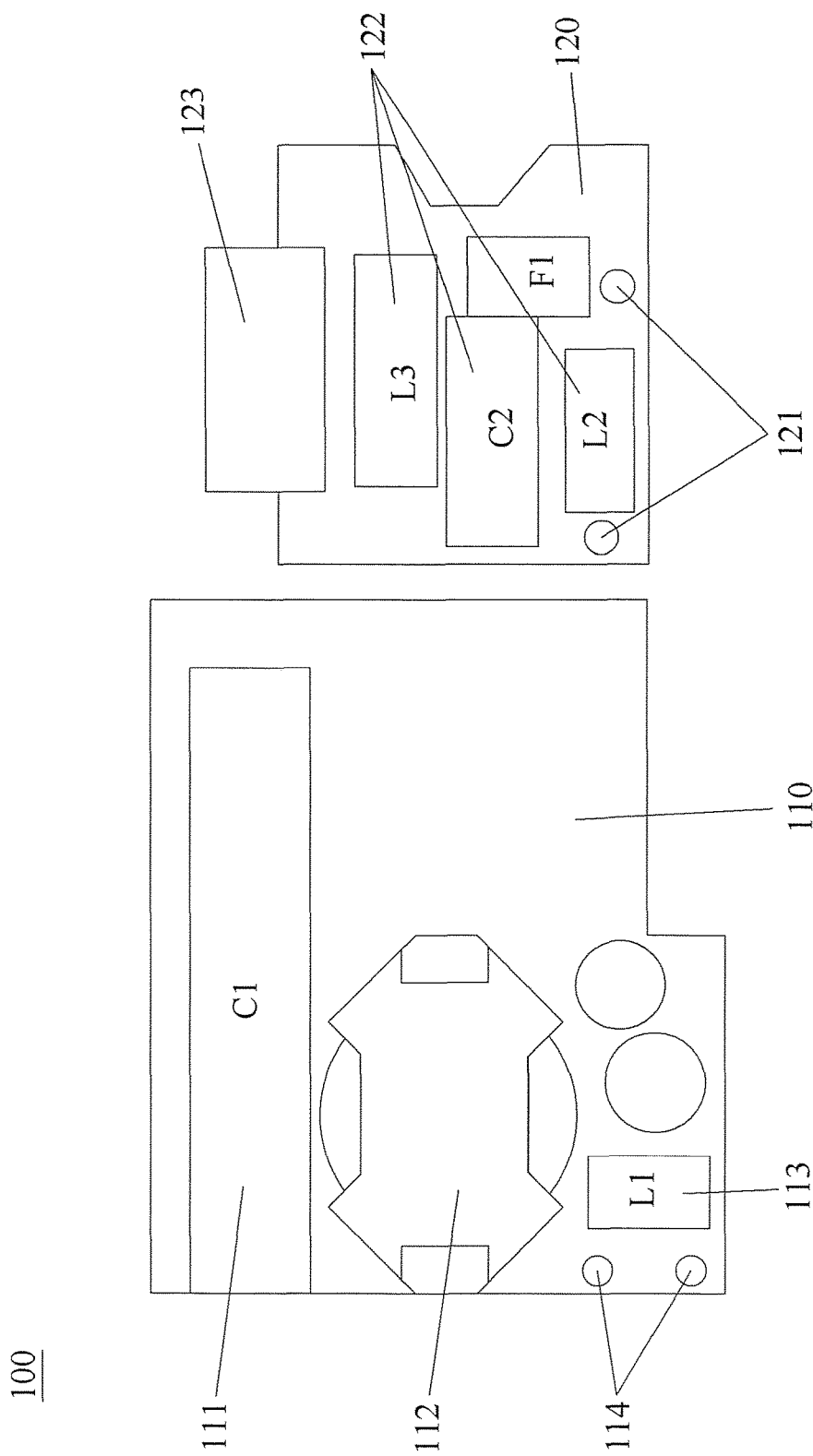
FIG. 4 is a front view of a circuit board of the power adapter of the first embodiment of the invention.

Referring to FIGS. 1-3, the auxiliary circuit board 120 has a first surface and a second surface opposite to each other, and the first surface of the auxiliary circuit board 120 is configured with the input rectifier filter circuit. The input rectifier filter circuit includes an input terminal 121, an electromagnetic interference (EMI) filter circuit 122 and the rectifier element 123. The second surface of the auxiliary circuit board 120 is configured with a voltage dividing circuit 124, and the voltage dividing circuit 124 is electrically connected between the EMI filter circuit 122 and the rectifier element 123. Pins of the rectifier element 123 are electrically connected to the first surface of the auxiliary circuit board 120, and the rectifier element 123 is located at a side surface of the auxiliary circuit board 120.

Referring to FIGS. 1-4, the input terminal 121 includes a port 1 and a port 2, where the port 1 and the port 2 are respectively a live line (L line) and an earth line (N line), and are connected to the input plug 140 (referring to FIG. 1) to transmit an input power to the EMI filter circuit 122. The EMI filter circuit 122 includes a second inductor L2, a second capacitor C2 and a third inductor L3 electrically connected to each other. The second inductor L2, the second capacitor C2 and the third inductor L3 are sequentially disposed between the input terminal 121 and the rectifier element 123. The rectifier element 123 includes four diodes. Moreover, the first surface of the auxiliary circuit board 120 is further configured with a fuse F1, and the fuse F1 is disposed between the second capacitor C2 and a side edge of the auxiliary circuit board 120, and two ends of the fuse F1 are electrically connected to the port 1 of the input terminal 121 and the second inductor L2 of the EMI filter circuit 122. Moreover, the voltage dividing circuit 124 includes two resistors, and the voltage dividing circuit 124 is electrically connected to the third inductor L3 of the EMI filter circuit 122 and the rectifier element 123.

Referring to FIGS. 1-2, when the auxiliary circuit board 120 is installed on the top of the main circuit board 110, the auxiliary circuit board 120 is disposed in parallel above the main circuit board 110, and the first surface thereof faces the first surface of the main circuit board 110. The auxiliary circuit board 120 is disposed at the end of the main circuit board 110 where the notch is located, and a longitudinal direction of the auxiliary circuit board 120 is complied with a lateral direction of the main circuit board 110. The components (for example, components of the EMI filter circuit 122) disposed on the first surface of the auxiliary circuit board 120 are located between the first surface of the main circuit board 110 and the first surface of the auxiliary circuit board 120, and a region on the first surface of the main circuit board 110 overlapped to the auxiliary circuit board 120 is used for configuring circuit wirings of second surface components of the main circuit board 110, so that the auxiliary circuit board 120 may effectively decrease a usage area of the main circuit board 110, and the components of the EMI filter circuit 122, the fuse F1 and first surface components of the main circuit board 110 are located on a same plane. The conductive member 130 supports between the main circuit board 110 and the auxiliary circuit board 120, and is electrically connected to the first capacitor 111 of the main circuit board 110 and the rectifier element 123 of the auxiliary circuit board 120, so as to transfer the power rectified and filtered by the auxiliary circuit board 120 to the main circuit board 110. In the present embodiment, the auxiliary circuit board 120 is supported by the first surface components of the main circuit board 110 and the conductive member 130. Certainly, other supporting members without an electrical conducting function can be disposed at diagonal corners of the auxiliary circuit board 120 to support the auxiliary circuit board 120.

Figure 5:
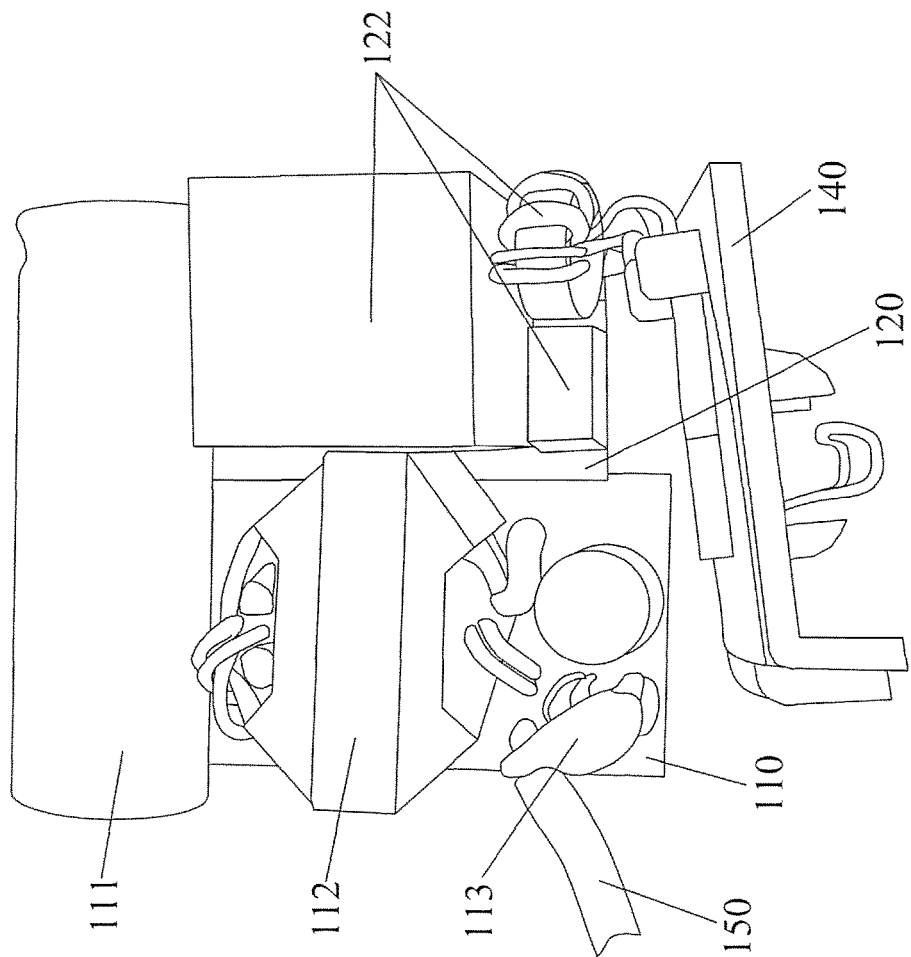
FIG. 5 is a three-dimensional view of a power adapter without a casing according to a second embodiment of the invention.
Figure 6:
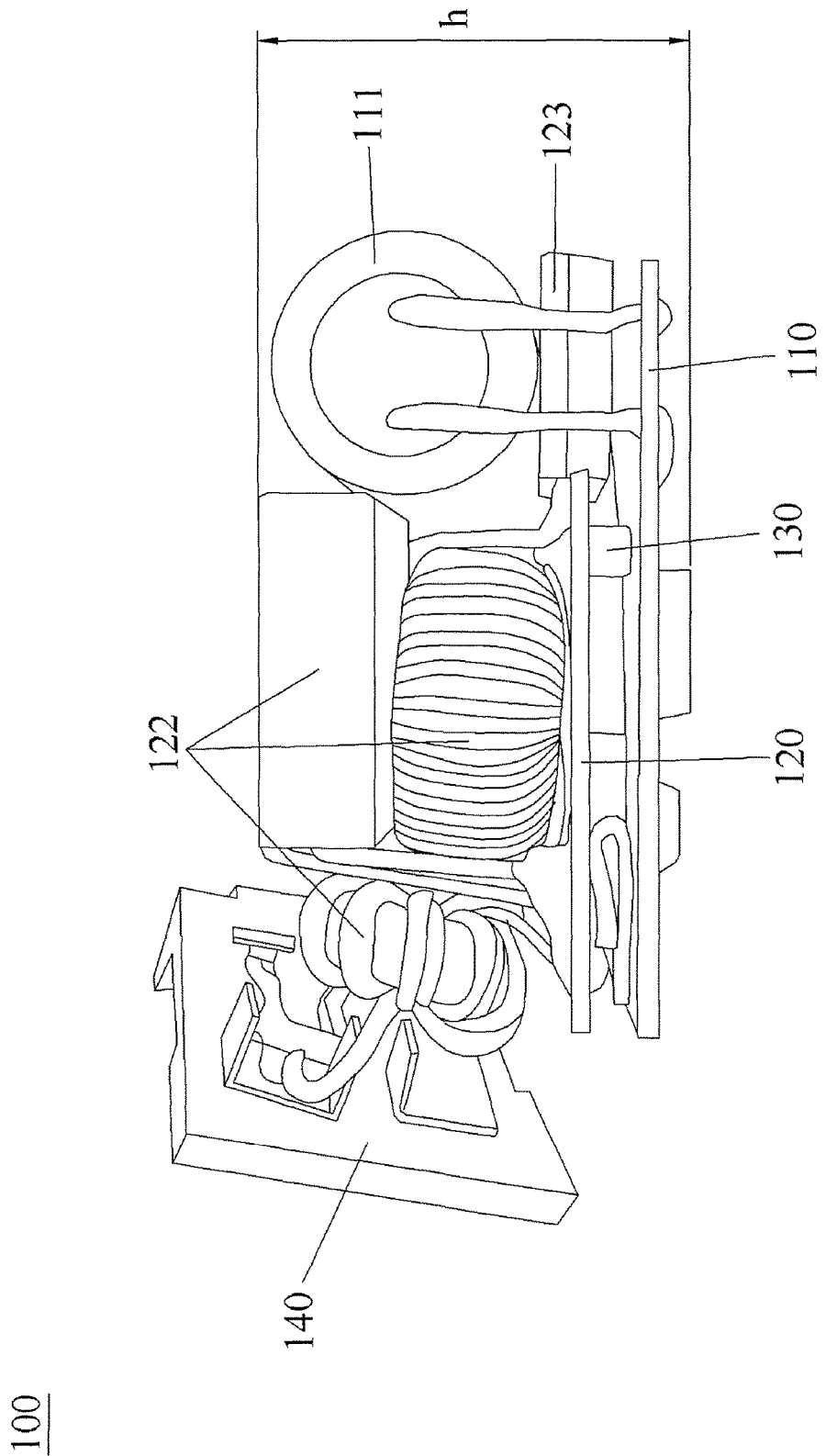
FIG. 6 is a side view of FIG. 5.
Figure 7:
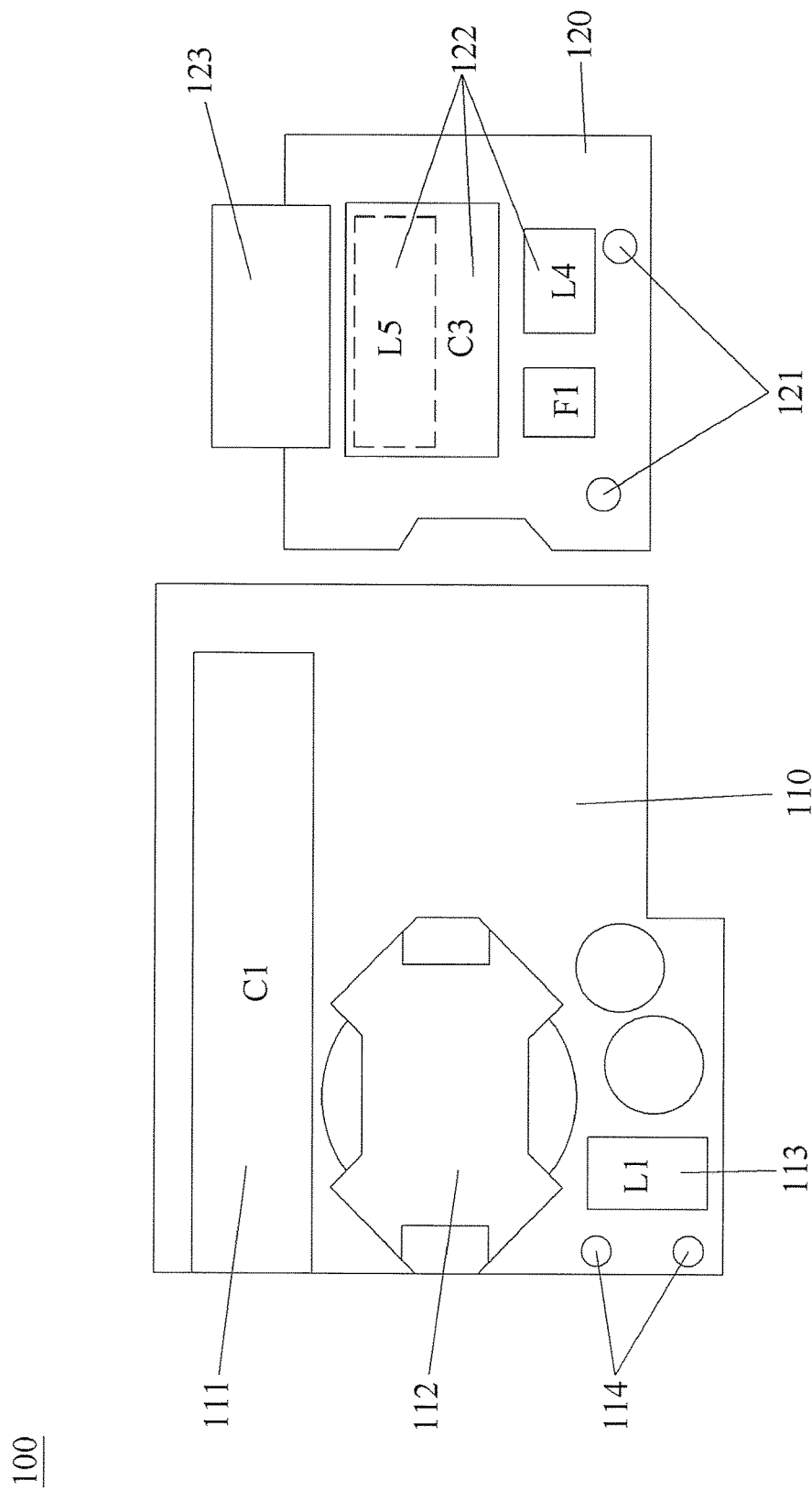
FIG. 7 is a front view of a circuit board of the power adapter of the second embodiment of the invention.
Figure 8:
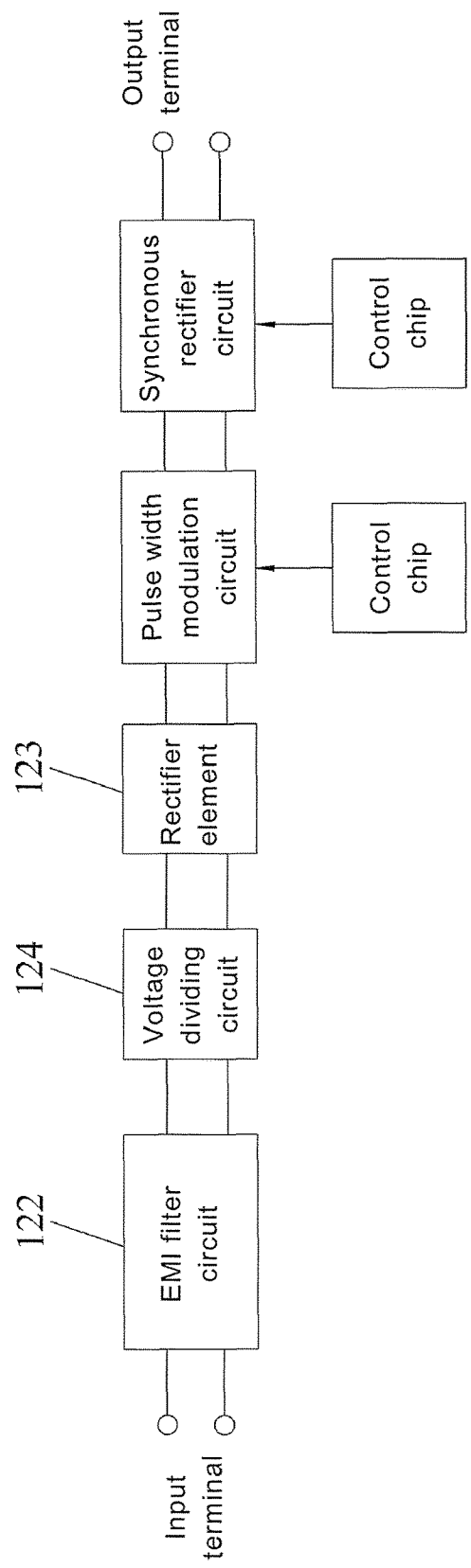
FIG. 8 is a circuit block diagram of a power adapter of the invention.

Referring to FIGS. 5-7, in a second embodiment of the invention, a structure of the main circuit board 110 of the present embodiment and a layout method of the components thereon are the same as those of the first embodiment, and detail thereof is not repeated. Only a component layout method of the auxiliary circuit board 120 and a connecting method between the auxiliary circuit board 120 and the main circuit board 110 are described below.

To be specific, the auxiliary circuit board 120 has a first surface and a second surface opposite to each other, where the first surface of the auxiliary circuit board 120 is configured with an input rectifier filter circuit, and the input rectifier filter circuit includes the input terminal 121, the EMI filter circuit 122 and the rectifier element 123. The second surface of the auxiliary circuit board 120 is configured with a voltage dividing circuit (not shown), and the voltage dividing circuit is electrically connected between the EMI filter circuit 122 and the rectifier element 123. The pins of the rectifier element 123 are electrically connected to the first surface of the auxiliary circuit board 120, and the rectifier element 123 is located at the side surface of the auxiliary circuit board 120.

Referring to FIGS. 5-7, the EMI filter circuit 122 includes a fourth inductor L4, a third capacitor C3 and a fifth inductor L5 electrically connected to each other, where the fourth inductor L4 and the fifth inductor L5 are sequentially disposed between the input terminal 121 and the rectifier element 123, and the third capacitor C3 is disposed above the fifth inductor L5 (referring to FIG. 6). Moreover, the first surface of the auxiliary circuit board 120 is further configured with a fuse F1, and the fuse F1 is disposed between the input terminal 121 and the third capacitor C3, and located at a side of the fourth inductor L4, and two ends of the fuse F1 are electrically connected to the port 1 of the input terminal 121 and the fourth inductor L4. Moreover, the voltage dividing circuit 124 includes two resistors, and the voltage dividing circuit 124 is electrically connected to the fifth inductor L5 of the EMI filter circuit 122 and the rectifier element 123.

Referring to FIGS. 5-6, when the auxiliary circuit board 120 is installed on the top of the main circuit board 110, the auxiliary circuit board 120 is disposed in parallel above the main circuit board 110, and the second surface thereof faces the first surface of the main circuit board 110. The auxiliary circuit board 120 is disposed at the end of the main circuit board 110 where the notch is located, and the components (for example, components of the EMI filter circuit 122) disposed on the first surface of the auxiliary circuit board 120 are away from the first surface of the main circuit board 110, and the rectifier element 123 is located below the first capacitor 111. A region on the first surface of the main circuit board 110 overlapped to the auxiliary circuit board 120 is used for configuring circuit wirings of second surface components of the main circuit board 110, so that the auxiliary circuit board 120 may effectively decrease a usage area of the main circuit board 110. The conductive member 130 supports between the first surface of the main circuit board 110 and the second surface of the auxiliary circuit board 120, and is electrically connected to the first capacitor 111 of the main circuit board 110 and the rectifier element 123 of the auxiliary circuit board 120, so as to transfer the power rectified and filtered by the auxiliary circuit board 120 to the main circuit board 110.

Referring to FIG. 2 and FIG. 6, since the components with larger volumes are gathered at a same side of the main circuit board 110, a height h of the power adapter 100 is about a sum of a height of the second surface components of the main circuit board 110, a thickness of the main circuit board 110, and a height of the auxiliary circuit board 120, so that the height of the power adapter 100 is decreased.

Referring to FIGS. 1-2 and 5-6, the power adapter 100 is obtained by assembling the main circuit board 110 and the auxiliary circuit board 120 in a casing, and the input plug 140 and the output line 150 are respectively located outside the casing for connecting an external power or a notebook computer, etc. A length of the power adapter 100 is between 44 mm and 47 mm, a width thereof is between 44 mm and 45 mm, and a height thereof is between 24 mm and 25 mm, and a power of the power adapter 100 is 55 watts to 65 watts. The power adapter 100 is adapted to provide power to a notebook computer, etc., and compared to the existing power adapter with the same power, the volume of the power adapter 100 is only a half of that of the existing power adapter.

In the power adapter 100 of the invention, since the front-end input rectifier filter circuit including input terminal 121, the EMI filter circuit 122 and the rectifier element 123 is independently disposed on the auxiliary circuit board, the main circuit board 110 has more space for configuring circuit wirings and components, so that a usage area of the main circuit board 110 is effectively decreased, and the length and width of the power adapter 100 are decreased. Meanwhile, by gathering the components with a larger volume such as the transformer 112 and the first capacitor 111 on the first surface of the main circuit board 110, the components with a smaller volume can be disposed on the second surface of the main circuit board 110, and the auxiliary circuit board 120 is disposed in parallel above the man circuit board 110, i.e. the components with similar heights are configured at a same side to facilitate close arrangement and decrease the height of the power adapter 100. Therefore, under a condition of same electrical parameters and dimensions, the volume of the power adapter 100 of the invention is only a half of that of the existing power adapter, which satisfies a demand for miniaturization of the electronic devices.

Other structures of the power adapter 100 of the present embodiment are known by those skilled in the art, and detail thereof is not repeated.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A power adapter, comprising:
a main circuit board, having a first surface and a second surface opposite to each other, wherein the first surface of the main circuit board is configured with a transformer and a first capacitor; and
an auxiliary circuit board, having a first surface and a second surface opposite to each other, wherein the first surface of the auxiliary circuit board is configured with an input rectifier filter circuit, wherein the input rectifier filter circuit comprises an input terminal, an electromagnetic interference filter circuit and a rectifier element,
wherein the auxiliary circuit board is disposed in parallel above the main circuit board, circuit wirings from electronic components on the second surface of the main circuit board are disposed on an overlapped region between the auxiliary circuit board and the first surface of the main circuit board, the first surface or the second surface of the auxiliary circuit board faces the first surface of the main circuit board, components of the electromagnetic interference filter circuit are disposed between the first surface of the auxiliary circuit board and the first surface of the main circuit board or disposed away from the first surface of the main circuit board, and the input rectifier filter circuit of the auxiliary circuit board is electrically connected to the first capacitor of the main circuit board.

2. The power adapter as claimed in claim 1, wherein the first surface of the main circuit board is further configured with a first inductor and an output terminal, the transformer, the first inductor, and the output terminal are disposed adjacent to the first capacitor and are electrically connected to each other, and the transformer, the first inductor and the output terminal are all located at an end away from the auxiliary circuit board.

3. The power adapter as claimed in claim 2, further comprising:
an output line, connected to the output terminal.

4. The power adapter as claimed in claim 1, wherein the first capacitor is an energy storage capacitor, and a capacity of the energy storage capacitor is between 65 µF and 100 µF.

5. The power adapter as claimed in claim 1, wherein the electromagnetic interference filter circuit comprises a second inductor, a second capacitor and a third inductor electrically connected to each other, and the second inductor, the second capacitor and the third inductor are sequentially disposed between the input terminal and the rectifier element.

6. The power adapter as claimed in claim 1, wherein the electromagnetic interference filter circuit comprises a fourth inductor, a third capacitor and a fifth inductor electrically connected to each other, the fourth inductor and the fifth inductor are sequentially disposed between the input terminal and the rectifier element, and the third capacitor is disposed above the fifth inductor.

7. The power adapter as claimed in claim 1, wherein pins of the rectifier element are electrically connected to the first surface of the auxiliary circuit board, and the rectifier element is located on a side surface of the auxiliary circuit board.

8. The power adapter as claimed in claim 1, wherein the second surface of the auxiliary circuit board is configured with a voltage dividing circuit, and the voltage dividing circuit is electrically connected between the electromagnetic interference filter circuit and the rectifier element.

9. The power adapter as claimed in claim 1, further comprising:
a conductive member, supporting between the main circuit board and the auxiliary circuit board, and electrically connected to the first capacitor of the main circuit board and the rectifier element of the auxiliary circuit board.

10. The power adapter as claimed in claim 1, further comprising:
an input plug, connected to the input terminal.

11. The power adapter as claimed in claim 1, wherein the second surface of the main circuit board is configured with a pulse width modulation circuit, a synchronous rectifier circuit and a control chip.

12. The power adapter as claimed in claim 1, wherein a longitudinal length of the main circuit board is greater than a lateral width of the main circuit board, and the auxiliary circuit board is disposed at an end of the main circuit board along a longitudinal direction.

13. The power adapter as claimed in claim 12, wherein the first capacitor has a long-shaft shape, and a long-shaft of the first capacitor is parallel to the longitudinal direction of the main circuit board.

14. The power adapter as claimed in claim 12, wherein an area of the auxiliary circuit board is one third of an area of the main circuit board.

15. The power adapter as claimed in claim 12, wherein a length of the main circuit board is between 41 mm and 43 mm, and a width of the main circuit board is between 39 mm and 40 mm.

16. The power adapter as claimed in claim 1, wherein a length of the power adapter is between 44 mm and 47 mm, a width of the power adapter is between 44 mm and 45 mm, and a height of the power adapter is between 24 mm and 25 mm.

17. The power adapter as claimed in claim 1, wherein a power of the power adapter is 55 watts to 65 watts.

* * * * *